W. & S. Thompson,
Coffee Cleaner.
No. 111,403.  Patented Jan. 31, 1871.
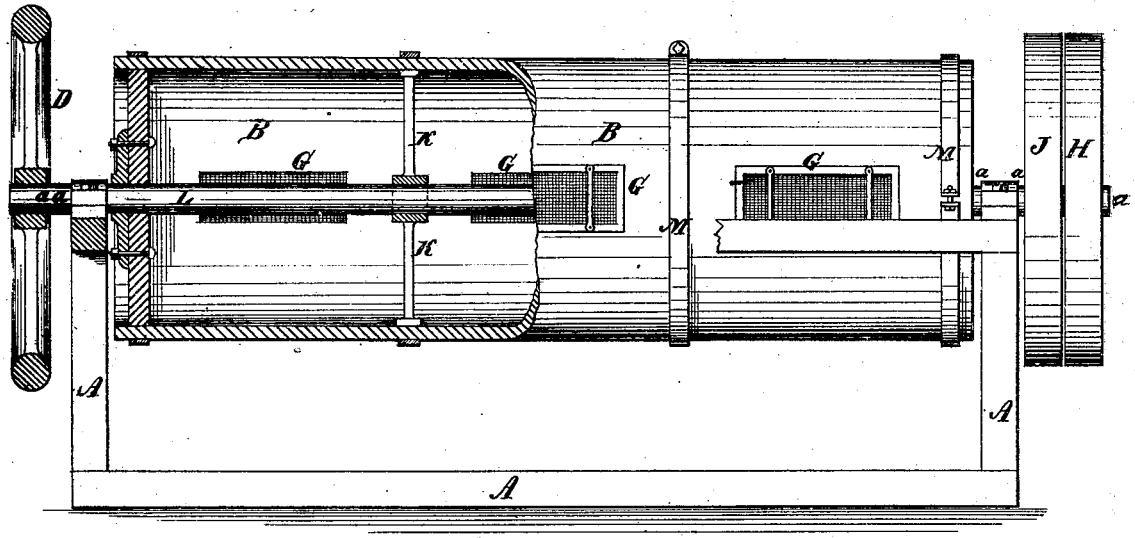
Witnesses:
Orlando F. Bump
Rob. W. Gale.
Inventor:
Wm. Thompson
Saml. Thompson

UNITED STATES PATENT OFFICE.

WILLIAM THOMPSON, OF NEW YORK, N. Y., AND SAMUEL THOMPSON, OF BALTIMORE, MARYLAND.

IMPROVEMENT IN CLEANING AND POLISHING COFFEE.

Specification forming part of Letters Patent No. 111,403, dated January 31, 1871.

Be it known that we, WILLIAM THOMPSON, of the city of New York, in the county of New York and State of New York, and SAMUEL THOMPSON, of the city of Baltimore, in the State of Maryland, have invented a new and useful Process for the Purpose of Cleaning and Polishing Coffee; and we do hereby declare that the following is a full, clear, and exact description of the same, reference being had to the annexed drawings, making a part of this specification.

Figure 1 represents a half-side view of the apparatus and a half-longitudinal section of the same.

A very large portion of the coffee imported into the United States is found to be mixed with many impurities, which are injurious not only in its use but detract from its marketable value. We have devised a means of cleaning such coffee of its impurities without the least injury to its quality; and our invention consists in the application of soap-stone and water to the coffee in a revolving cylinder.

To enable others skilled in the art to use our process, we will proceed to describe the construction of the apparatus and the mode of applying the process.

A represents the frame of the machine, upon which the cylinder B is supported by the journals $a$ $a$. The cylinder B is simply a hollow cylinder with closed heads, and may be made of wood or iron or any other suitable material; but wood is preferable, inasmuch as metal is apt to discolor the coffee.

C represents the central shaft, connecting with the journals $a$ $a$.

The cylinder is provided with three sets of doors, G, which are screen-doors, being covered with a wire screen, so that the fine material which is rubbed off from the coffee may pass out.

D represents the fly-wheel. H represents a fixed pulley. I represents the loose pulley, to which the power used for revolving the cylinder may be applied.

K represents an arm of the shaft L, connecting with the sides of the cylinder B, and used to support and strengthen the central shaft, L. Three of these are placed in the cylinder at the points indicated by the letter K.

M represents an iron band used to strengthen the cylinder when made of wood. Three of these are used at the points indicated by the letter M.

The process of cleaning and polishing coffee by the use of soap-stone and water in connection with a revolving cylinder is applied as follows: The cylinder, being charged with coffee, (a charge in an ordinary cylinder being twelve bags of coffee, each bag weighing one hundred and sixty pounds,) is put in motion and allowed to revolve until the dust or other foreign matter is ejected from the coffee. The cylinder is then stopped, and a proper quantity of water is sprinkled over the coffee with a watering-pot or other contrivance. The cylinder is again placed in motion and allowed to revolve until all the beans of the coffee have partaken of the moisture, which leaves the coffee in a rough state. The cylinder is again stopped, and a proper quantity of finely-powdered soap-stone is dusted over the coffee from a dredge-box or other suitable contrivance. The cylinder, being again placed in motion, is allowed to revolve until the coffee has become scoured by the action of the soap-stone, which restores the coffee to its original appearance, and imparts a gloss which greatly adds to its merchantable value. During the latter part of the process the superfluous soap-stone is ejected from the cylinder in the same manner as the dust, &c., were in the beginning—viz., through the wire doors of the cylinder—while the cylinder is in motion.

To fully explain our process, we will divide coffee into three grades or classes, two of which require a different treatment by our process, which is not applicable to the third.

First, old coffee which has lost its character by age. This grade requires from one-half to two gallons of water to each charge, and from one-half to one pound of powdered soap-stone, according to the amount or grade of polish desired.

Second, coffee which has a coating of black dust. On this grade we use but a small quantity of powdered soap-stone—say, one-fourth of a pound to each charge. Water is not used with this grade of coffee.

Third, coffee of an oily, glossy nature. Our process cannot be applied to this grade with equal success.

Any other form of steatite may be used as well as soap-stone. Talc may also be used instead of soap-stone, but not with equal advantage.

Having thus fully described our process of cleaning and polishing coffee, we would state that we do not lay any claim to the apparatus herein described independently and apart from its use in our process.

What we claim as our invention, and desire to secure by Letters Patent, is—

1. The process of cleaning and polishing coffee by subjecting it to the action of soap-stone or the substances herein described as appropriate substitutes therefor in a revolving cylinder, constructed substantially as herein described.

2. The process of cleaning and polishing coffee by subjecting it to the action of water, in combination with soap-stone or the substances herein described as appropriate substitutes therefor, in a revolving cylinder, constructed substantially as herein described.

WILLIAM THOMPSON.
SAMUEL THOMPSON.

Witnesses:
ORLANDO F. BUMP,
ROB. W. GALE.